United States Patent
Hamza et al.

(10) Patent No.: US 7,184,585 B2
(45) Date of Patent: Feb. 27, 2007

(54) OBJECT DETECTION

(75) Inventors: Ridha M. Hamza, Minneapolis, MN (US); Darren Duane Cofer, Minnentonka, MN (US)

(73) Assignee: Honeywell International Inc., Morristown, NJ (US)

( * ) Notice: Subject to any disclaimer, the term of this patent is extended or adjusted under 35 U.S.C. 154(b) by 393 days.

(21) Appl. No.: 10/757,674

(22) Filed: Jan. 14, 2004

(65) Prior Publication Data

US 2004/0146184 A1    Jul. 29, 2004

Related U.S. Application Data

(63) Continuation of application No. 09/716,002, filed on Nov. 17, 2000, now Pat. No. 6,711,279.

(51) Int. Cl.
*G06K 9/00* (2006.01)
*G06K 9/20* (2006.01)
*H04N 9/47* (2006.01)
*H04N 7/18* (2006.01)

(52) U.S. Cl. ............... 382/141; 382/181; 382/282; 348/135

(58) Field of Classification Search ............ 382/103, 382/141, 142, 143, 144, 181, 282, 283; 348/135, 348/136, 143, 148, 149, 152
See application file for complete search history.

(56) References Cited

U.S. PATENT DOCUMENTS

| | | | |
|---|---|---|---|
| 4,923,066 A | 5/1990 | Ophir et al. | |
| 5,065,237 A * | 11/1991 | Tsikos et al. ............. | 348/91 |
| D347,442 S | 5/1994 | Falconer | |
| D349,713 S | 8/1994 | Hasegawa | |
| D349,714 S | 8/1994 | Hasegawa | |
| D349,911 S | 8/1994 | Shimizu et al. | |
| D349,913 S | 8/1994 | Morris | |
| 5,359,363 A | 10/1994 | Kuban et al. | |
| D354,973 S | 1/1995 | Hisatune et al. | |
| 5,402,168 A | 3/1995 | Fouilloy | |

(Continued)

FOREIGN PATENT DOCUMENTS

EP    0631430 A2    6/1994

(Continued)

OTHER PUBLICATIONS

Aach, T., et al., "Statistical Model-Based Change Detection in Moving Video," Signal Processing, vol. 31, No. 2, pp. 165-180, Mar. 1993.

(Continued)

*Primary Examiner*—Yon J. Couso
(74) *Attorney, Agent, or Firm*—Kris T. Fredrick

(57) ABSTRACT

A method for object detection that utilizes a patterned background. Patterned backgrounds are chosen such that each reference image analyzed will have both light and dark pixels. The method calculates the difference between the expected value for the light pixels and the expected value of the dark pixels in the reference image. This difference is used to chose a threshold value. The difference in expected values for the corresponding pixels in a live image is calculated and compared to the threshold value. If the difference in expected values of the live image are less than the threshold value, object detection is indicated.

25 Claims, 4 Drawing Sheets

U.S. PATENT DOCUMENTS

| | | | |
|---|---|---|---|
| 5,418,567 A | 5/1995 | Boers et al. | |
| 5,436,462 A | 7/1995 | Huli-Allen | |
| 5,448,320 A | 9/1995 | Sakai et al. | |
| 5,477,212 A | 12/1995 | Rumpel | |
| D365,834 S | 1/1996 | Dozier | |
| 5,539,199 A | 7/1996 | Ruckh et al. | |
| 5,573,006 A | 11/1996 | Shimotani et al. | |
| D378,095 S | 2/1997 | Hasegawa | |
| 5,613,013 A | 3/1997 | Schuette | |
| 5,627,616 A | 5/1997 | Sergeant et al. | |
| 5,649,255 A | 7/1997 | Schieltz | |
| 5,657,076 A | 8/1997 | Tapp | |
| 5,677,535 A | 10/1997 | Stephan | |
| 5,691,765 A | 11/1997 | Schieltz et al. | |
| 5,731,832 A | 3/1998 | Ng | |
| 5,745,170 A | 4/1998 | Palmer | |
| 5,752,100 A | 5/1998 | Schrock | |
| 5,790,910 A | 8/1998 | Haskin | |
| 5,793,900 A | 8/1998 | Nourbakhsh et al. | |
| 5,795,306 A | 8/1998 | Shimotani et al. | |
| 5,801,770 A | 9/1998 | Paff et al. | |
| D399,517 S | 10/1998 | Hasegawa | |
| 5,818,519 A | 10/1998 | Wren | |
| 5,835,218 A | 11/1998 | Harding | |
| 5,835,613 A | 11/1998 | Breed et al. | |
| 5,845,000 A | 12/1998 | Breed et al. | |
| 5,852,754 A | 12/1998 | Schneider | |
| 5,870,135 A | 2/1999 | Glatt et al. | |
| 5,878,156 A | 3/1999 | Okumura | |
| 5,953,055 A | 9/1999 | Huang et al. | |
| 5,953,076 A * | 9/1999 | Astle et al. | 348/584 |
| 5,980,123 A | 11/1999 | Heifler | |
| 6,035,067 A | 3/2000 | Ponticos | |
| 6,286,349 B1 | 9/2001 | Muller et al. | |
| 6,392,754 B1 | 5/2002 | Pingel et al. | |
| 6,456,320 B2 | 9/2002 | Kuwano et al. | |
| 6,456,384 B1 | 9/2002 | Kulawiec et al. | |
| 6,496,253 B1 | 12/2002 | Vokhmin | |
| 6,509,967 B1 | 1/2003 | Pingel et al. | |
| 6,564,166 B1 | 5/2003 | Ume et al. | |
| 2004/0066970 A1* | 4/2004 | Matsugu | 382/217 |

FOREIGN PATENT DOCUMENTS

| | | |
|---|---|---|
| EP | 0610863 A1 | 8/1994 |
| EP | 0654684 A2 | 5/1995 |
| EP | 0468839 B1 | 9/1995 |
| EP | 0691632 A1 | 1/1996 |
| EP | 0491121 B1 | 2/1996 |
| EP | 0519379 B1 | 9/1996 |
| EP | 0554197 B1 | 10/1996 |
| EP | 0484076 B1 | 12/1996 |
| EP | 0529317 B1 | 12/1996 |
| EP | 0747868 A | 12/1996 |
| EP | 0772169 A2 | 5/1997 |
| EP | 0774730 A2 | 5/1997 |
| EP | 0800152 A1 | 10/1997 |
| EP | 0810791 A2 | 12/1997 |
| EP | 0585033 B1 | 1/1998 |
| EP | 0575220 B1 | 3/1998 |
| EP | 0833503 A | 4/1998 |
| EP | 0632858 B1 | 8/1998 |
| EP | 0691632 B1 | 10/1998 |
| EP | 1168269 A2 | 5/2001 |
| JP | 07056219 | 8/1993 |
| JP | 07104362 | 10/1993 |
| JP | 07159892 | 12/1993 |
| JP | 07175128 | 12/1993 |
| JP | 07191390 | 12/1993 |
| JP | 07222039 | 1/1994 |
| JP | 07255004 | 3/1994 |
| JP | 07281276 | 4/1994 |
| JP | 08076213 | 9/1994 |
| JP | 08140941 | 11/1994 |
| JP | 09083999 | 9/1995 |
| JP | 09193078 | 1/1996 |
| JP | 10031256 | 7/1996 |
| JP | 10042231 | 7/1996 |
| WO | WO 84/03784 | 9/1984 |
| WO | WO 97/01246 | 1/1997 |
| WO | WO 97/05741 | 2/1997 |
| WO | WO 97/05744 | 2/1997 |
| WO | WO 97/12278 | 4/1997 |
| WO | WO 98/18026 | 4/1998 |
| WO | WO 98/46116 | 10/1998 |
| WO | WO 98/47025 | 10/1998 |
| WO | WO 0233671 | 4/2002 |

OTHER PUBLICATIONS

Asundi et al., "Digital moiré for measurements on cylindrical objects", J. Opt. 29 (1998), pp. 128-134.

Asundi, et al., "Digital Moire applications in Automated Inspection", SPIE vol. 2347, pp. 270-275, 0-8194-1682-7/94.

Barski, et al., "Characterization, detection and suppression of stationary grids in digital projection radiography imagery," SPIE, vol. 3658, Feb. 1999.

Batouche, "A Knowledge Based System for diagnosing spinal deformations: Moire Pattern Analysis and Interpretation", 11th IAPR International Conference on Pattern Recognition, pp. 591-594, The Hague, The Netherlands, Aug. 30-Sep. 3, 1992.

Blanco et al., "Study of Plate Vibrations by Moire Holography", SPIE Vo. 1508, Industrial Applications of Holographic and Speckle measuring Techniques, pp. 180-190, 1991.

Bruynooghe et al., "Fast algorithms for automatic moiré fringe analysis. Application to non-contact measurements for quality control of industrial components", SPIE vol. 2786, 0-8194-2172-3/96, pp. 54-67.

Bruynooghe, et al., "Real-time digital/optical system for quality control by moiré image processing", SPIE vol. 3208, pp. 445-454, 0277-786X/97.

Campos et al., "Moire Interferometry With Psuedo-Random Screens", SPIE vol. 1983 Optics as a Key to High Technology, pp. 724-725, (1993).

Chang et al., "Analysis of CCD moiré pattern with the wavelet transform", Part of the SPIE Conference on Wavelet Applications VI, Orlando, Florida, Apr. 1999, pp. 420-428, SPIE vol. 3723 0277-786X/99.

Chang-Hua Hu and Yu-Wen Qin, "Digital color encoding and its application to the moire technique," Applied Optics, vol. 36, No. 16, pp. 3682-3685, Jun. 1, 1997.

Fang, "Optical modulation and digital demodulation of an in-plane moiré carrier", Optics & Laser Technology, vol. 23, No. 6, pp. 349-352, 1991.

Gallarda et al., "3-D Gradient and Curvature Measurement Using Local Image Information", SPIE vol. 1194 Optics, Illumination, and Image Sensing for Machine Vision IV (1989), pp. 198-208.

Gazzero et al., "Restoration of Images Transmitted Through Coherent Fiber Bundles", SPIE vol. 12332, Medical Imaging IV: Image Capture and Display, pp. 20-25, 1990.

Hotter, M., et al., "Image Segmentation Based on Object Oriented Mapping Parameter Estimation," Signal Processing, vol. 15, No. 3, pp. 315-334, Oct. 1988.

Jianu et al., "Talbot-moire deflectometry with direct spatial reconstruction of optical phase", SPIE vol. 3405 0277-786X/98, pp. 517-521.

Jinhong et al., "Temperature Mapping by Double Grating diffraction System with Microcomputer Image Process", SPIE vol. 1230 International Conference on Optoelectronic Science and Engineering '90, pp. 196-198.

Krumm, et al., "Sampled-grating and crossed-grating models of moiré patterns from digital imaging", Optical Engineering, vol. 30, No. 2, pp. 195-206, Feb. 1991.

Kunihiko Mori, et al., "Fringe pattern analysis using hybrid image processing", Applied Optics, vol. 29, No. 11, pp. 1646-1817, Apr. 10, 1990.

Loske, et al., "Two-dimensional spatial correlator for lens-free image processing", Optik, 103, No. 2, pp. 59-65, 1996.

Moran et al., "Automatic digitization and analysis of moiré topograms on a personal computer for clinical use", Med. Eng. Phys., vol. 16, pp. 259-264, May 1994.

Morimoto et al., "Strain analysis by mismatch moiré method and grid method using Fourier transform", Computational Mechanics (1990) 6, pp. 1-10.

Nakamura et al., High Quality Image Processing Method using Moire Suppression and Edge Enhancement Filtering, pp. 445-450.

Ostermann, J., "Modelling of 3D moving objects for an analysis-synthesis coder," SPIE-SPSE: Symposium on Sensing and reconstruction of 3D objects and Scenes, Proc. SPIE 1260, pp. 240-249, Santa Clara, CA, Feb. 1990.

Ostermann, J., "Segmentation of Image Areas Changed Due to Object Motion Considering Shadows," Multimedia Communications and Video Coding, pp. 241-246, Y. Wang, Ed., New York: Plenum, 1996.

Qifeng et al., "A New Method For Constructing Digital-Strain-Field-Images From Moire Patterns", Chinese Journal of Aeronautics, vol. 3, No. 1, pp. 16-22, Feb. 1990.

Qifeng, Yu, et al., "Digital pure shear-strain moiré patterns", Applied Optics, vol. 31, No. 11, pp. 1813-1817, Apr. 10, 1992.

Rastogi et al., "Parallel Image Processing Software on Anupam", Computer Division, BARC, Trombay, Bombay-400085, pp. 173-178.

Rodriguez-Vera, "Three-dimensional gauging by electronic moiré contouring", Revista Mexicana de Fisica 40, No. 3, pp. 447-458, 1994.

Rosenblum et al., "Computerized Moire Analysis of Progressive Addition Lenses", Optometery and Vision Science, vol. 69, No. 12, pp. 936-940, 1992.

Sajan, et al., "TDI imaging and scanning moiré for online defect detection", Optics & Laser Technology, vol. 29, No. 6, pp. 327-331, 1997.

Setiawan Hadi, "Circular Moire Patterns In 3D Vision Applications", A Thesis Submitted In Partial Fulfillment of the Requirements for the Degree of Master of Computer Science in the Faculty of Computer Science, The University of New Brunswick, May 1996.

Skifstad, K., et al., "Illumination Independent Change Detection for Real World Image Sequences," Computer Vision, Graphics, and Image Processing, vol. 46, No. 3, pp. 387-399, Jun. 1989.

Stauder, J., Segmentation of Moving Objects in Presence of Moving Shadows: Proc. Int. Workshop on Coding Techniques for Very Low Bit Rate Video, Linkoping, Sweden, Jul. 28-30, 1997, pp. 41-44.

Stauder, J., et al., "Detection of Moving Case Shadows for Object Segmentation," IEEE Trans. on Multimedia, vol. 1, No. 1, pp. 65-76, Mar. 1999.

Tran, Lee, Zhang, Lo, "Ultrafine Motion Detection of Micromechanical Structures Using Optical Moire Patterns," IEEE Photonics Technology Letter, vol. 8, No. 8, pp. 1058-1060, Aug. 1996.

Venkatseh, S., "Dynamic Threshold Determination by Local and Global Edge Evaluation," Graphical models and image procession, vol. 57, No. 2, pp. 146-160, Mar. 1995.

Vertregt, et al., "FA 7.4 A 0.4W Mixed-Signal Digital Storage Oscilloscope Processor with Moire Prevention, Embedded 393kb RAM and 50MSample/s 8b ADC", IEEE International Solid-State Circuits Conference, pp. 114-115, 1998.

Voloshin and Tsao, "Effect of Geometry on the Strain in Electronic Packages," Proceedings Microelectronics Education For The Future, Ninth Biennial University/Government/Industry Microelectronics Symposium, pp. 246-251, Melbourne, Florida, Jun. 12-14, 1991.

Weszka, J.S., "SURVEY: A Survey of Threshold Selection Techniques," Computer Graphics and Image Processing 7, vol. 7, No. 2, pp. 259-265, Apr. 1978.

Xiangdong Liu, "Analysis and Reduction of Moire Patterns in Scanned Halftone Pictures", Dissertation submitted to the faculty of Virginia Polytechnic Institute and State University, Blacksburg, Virginia, May 1996.

Xiong, W., et al., "Efficient Scene Change Detection and Camera Motion Annotation, for Video Classification," Computer Vision and Image Understanding, vol. 71, No. 2, pp. 166-181, Aug. 1998.

* cited by examiner

OBJECT DETECTION

This application is a continuation of U.S. Patent Application Ser. No. 09/716,002, filed Nov. 17, 2000, entitled OBJECT DETECTION, issued as U.S. Pat. No. 6,711,279 on Mar. 23, 2004.

FIELD OF THE INVENTION

The present invention relates to object detection. More specifically, the present invention relates to the detection of objects in a user-defined area having a patterned background.

BACKGROUND OF THE INVENTION

Motion detection and object detection systems are known in the art. Frequently, such systems are used to monitor a user-defined area to detect whenever an object enters the area. The equipment needed to implement an object detection system is well known in the art. Such systems comprise an imaging device (typically a video camera) capable of capturing an image of the monitored area and a device for digitizing the captured images. The digitized images are then analyzed in an attempt to detect whether an object has entered the monitored area. There exist many different known methods and algorithms for analyzing digitized images for determining when an object has entered a monitored area. Two of the most common methods utilized are generally referred to as motion segmentation methods or change detection methods.

A change detection method of object detection in an image is accomplished by examining the difference between a current image and a reference image that contains only the static background of the monitored area or scene. A reference image can be thought of as a representation of the monitored area as it would appear if no transitory objects were in view. Change detection algorithms take two digitized images as input and return the locations in the field of view where differences between the images are identified. These differences may be caused by the motion of an object in the field of view, the addition or removal of an object from the scene, changes in illumination, or noise from the digitization process. The objective of change detection algorithms is to locate only the changes that are due to structural changes in the scene, that is, an object moving or the introduction or removal of an object in the scene.

However, many object detection systems are utilized in environments that cause shadows to be cast on the monitored area or zone or in environments that experience significant changes in ambient lighting conditions. Such environments are often found in industrial settings. Shadows may be caused by direct and/or diffuse illumination from the environment outside the monitored area. Objects moving near the monitored area may have their shadows cast into the monitored area. Additionally, shadows may change as the lighting conditions in the environment change. Changes in the lighting conditions may be due to changes in the amount of illumination or movement of the light source.

Object detection systems need to distinguish actual objects in a monitored area from shadows that are being cast into the area and changes in the ambient lighting conditions. Existing techniques have attempted to distinguish actual objects in a monitored area from shadows that are being cast into the area and changes in the ambient lighting conditions, but these existing techniques have enjoyed limited success. Therefore, a need continues to exist in the art for object detection systems and methods that are superior to existing systems and methods for distinguishing objects from shadows and changing lighting conditions.

SUMMARY OF THE INVENTION

The present invention provides for object detection that is superior to the prior art at distinguishing between objects that have moved into a monitored area and shadows that have been cast into the monitored area. A patterned background is utilized in the present invention. According to the present invention, portions of the patterned background are analyzed to determine whether an object exists in any of the portions. For purposes of the present specification, each portion of the patterned background is referred to as a mask window. Preferably, the size of the mask window is designed so that it is no larger than the approximate size of the smallest object for which detection is desired. Mask windows are overlapped in a manner so as to cover the area for which object detection is desired. The patterned background is designed so that each mask window contains both light areas and dark areas. In a preferred embodiment, the patterned background is designed so that in each mask window the amount of light area and amount of dark area is approximately equal.

The present invention takes advantages of certain phenomena that occur when, in accordance with the present invention, a live image is compared to a reference image exhibiting a patterned background. First, a difference image produced by subtracting the reference image from a live image containing an object will contain a complement or inverse image of the object. Second, live images containing shadows instead of objects tend to not produce any complements or inverse images in a difference image.

Because the overall background pattern and the position of each mask window are known and do not change during object detection, the background pattern within each mask window is known and is constant. Thus, certain calculations corresponding to each reference image can be made once during initialization of the object detection system and then used as constants during analysis of a live image. This use of constants calculated at initialization allows for faster image analysis at run time, which in turn allows image capture devices with faster frame rates to be used.

According to the present invention, an object is detected when the difference between the expected value for the brightness levels in the portion of the live image corresponding to the portion of the reference image containing light pixels and the expected value for the brightness levels in the portion of the live image corresponding to the portion of the reference image containing dark pixels is less than some threshold T. Stated another way, object detection is indicated whenever the following relationship holds:

$$(E[\text{Live}_L(x,y)] - E[\text{Live}_D(x,y)]) < T,$$

wherein $E[\text{Live}_L(x,y)]$ is the expected value for the brightness levels in the portion of the live image corresponding to the portion of the reference image containing light pixels, wherein $E[\text{Live}_D(x,y)]$ is the expected value for the brightness levels in the portion of the live image corresponding to the portion of the reference image containing dark pixels, wherein $0 < T < \gamma_{ref}$, wherein $\gamma_{ref} = (E[\text{Ref}_L(x,y)] - E[\text{Ref}_D(x,y)])$, wherein $E[\text{Ref}_L(x,y)]$ is the expected value of the brightness levels of the light pixels in the reference image and $E[\text{Ref}_D(x,y)]$ is the expected value of the brightness levels of the dark pixels in the reference image. In a preferred embodiment of the present invention, T is equal to about $\gamma_{ref}/2$.

As explained above, $\gamma_{ref}$ can be calculated once and T can be chosen once at the time when a system embodying the present invention is setup or initialized and then both $\gamma_{ref}$ and T can be used as constants throughout the operation of the system. Alternatively, the reference image could be updated periodically and new values for $\gamma_{ref}$ and T calculated. Updating the reference image periodically would allow for embodiments of the present invention to account for changes in the environment, such as a slight deterioration of the background pattern over time.

The present invention can be embodied in a monitoring system able to detect the intrusion of people (or other objects) into a user-defined safety zone. The present invention provides superior methods for distinguishing between objects actually entering the user-defined area and shadows caused to be cast onto the user-defined area by changes in lighting or objects moving near the user-defined area.

DETAILED DESCRIPTION OF THE INVENTION

Unless indicated otherwise, the term "image" used in the current specification will refer to a digitized image having an array or vector of numbers representing brightness (that is, luminance intensity) levels. Each brightness level ranges from 0 (the darkest) to $I_{max}$ (the brightest). In embodiments of the present invention, the actual numerical intensity levels may range from 0 to 1.0 or from 0 (00000000 in binary notation) to 255 (11111111 in binary notation), for example, depending on the specific equipment utilized. Equipment for digitizing images and converting to arrays of brightness levels is well known in the art. The numerical brightness levels are frequently referred to as pixels.

According to the present invention, each captured image of the monitored area is divided up into portions or segments. These portions or segments are referred to as mask windows. The size of each mask window is chosen so that it is no bigger than the approximate size of the smallest object for which detection is desired. This is referred to as the target size. The present invention can detect objects smaller than the mask window, but the smaller an object is relative to the mask window, the lower the probability will be that the object will be detected. Thus, the size of objects to be detected are preferably at least as big as the area represented by the mask window.

Positions of mask windows are chosen so that the entire area to be monitored is covered by overlapping mask windows. Preferably, each mask window overlaps at least one other mask window. More preferably, each mask window overlaps approximately one half of at least one other mask window.

For each captured image of the monitored area, the image corresponding to each mask window is analyzed for object detection. Generally, object detection according to the present invention can be implemented on standard hardware known to one of ordinary skill in the art to operate sufficiently fast to complete analysis of all window masks for each capture image before the next image of the monitored area is captured.

Figure 1:
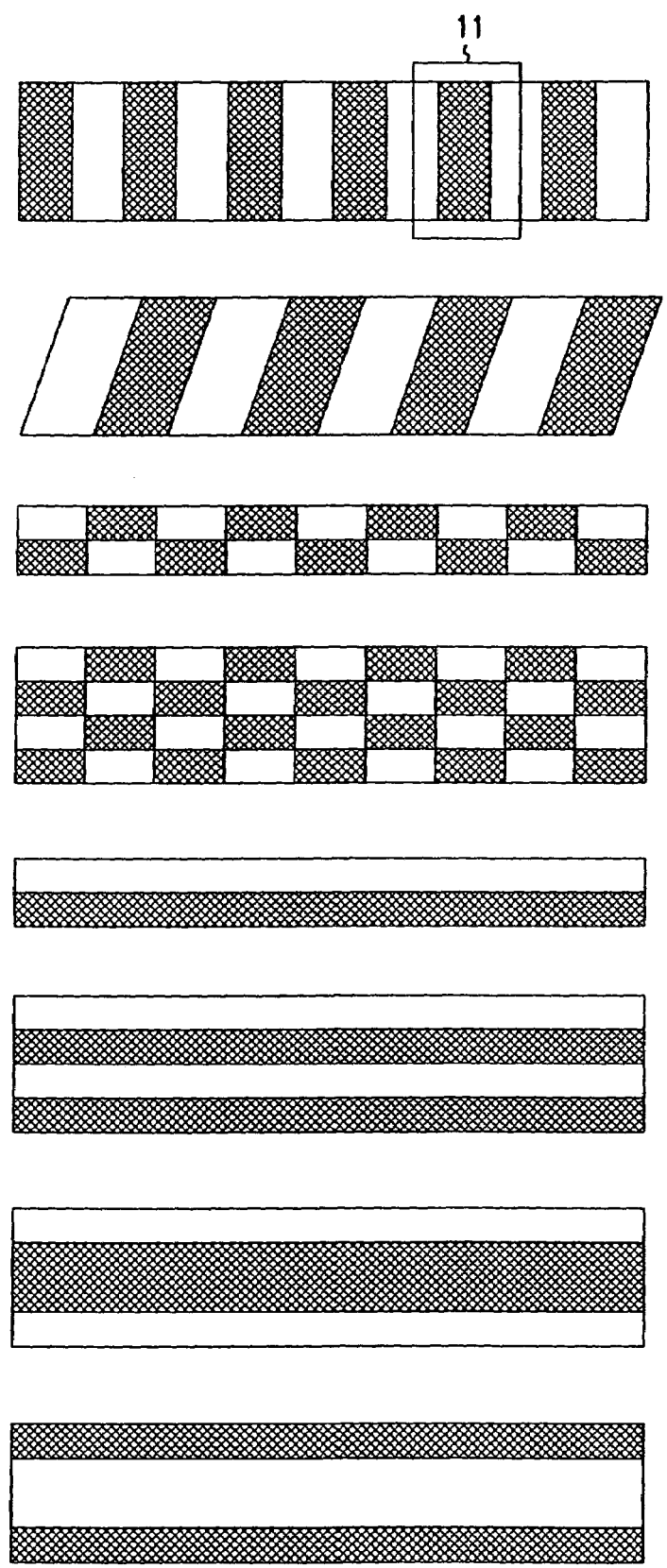
FIG. 1 depicts examples of patterns useful in the present invention.

The present invention provides for improved object detection in monitored areas having a patterned background. The patterned background is designed so that each mask window contains both light areas and dark areas. In a preferred embodiment, the patterned background is designed so that in each mask window the amount of light area and amount of dark area is approximately equal. FIG. 1 depicts examples of patterns useful in the present invention. The light and dark areas of a pattern are designed so that the brightness value or intensity level of the image pixels corresponding to the light areas is substantially greater than the brightness value or intensity level of the image pixels corresponding to the dark areas. The image pixels corresponding to the dark areas will all have values much less than $I_{max}$, and preferably, they will all have values close to zero. Similarly, the image pixels corresponding to the light areas will all have values much greater than zero, and preferably, they will all have values close to $I_{max}$.

Figure 2:
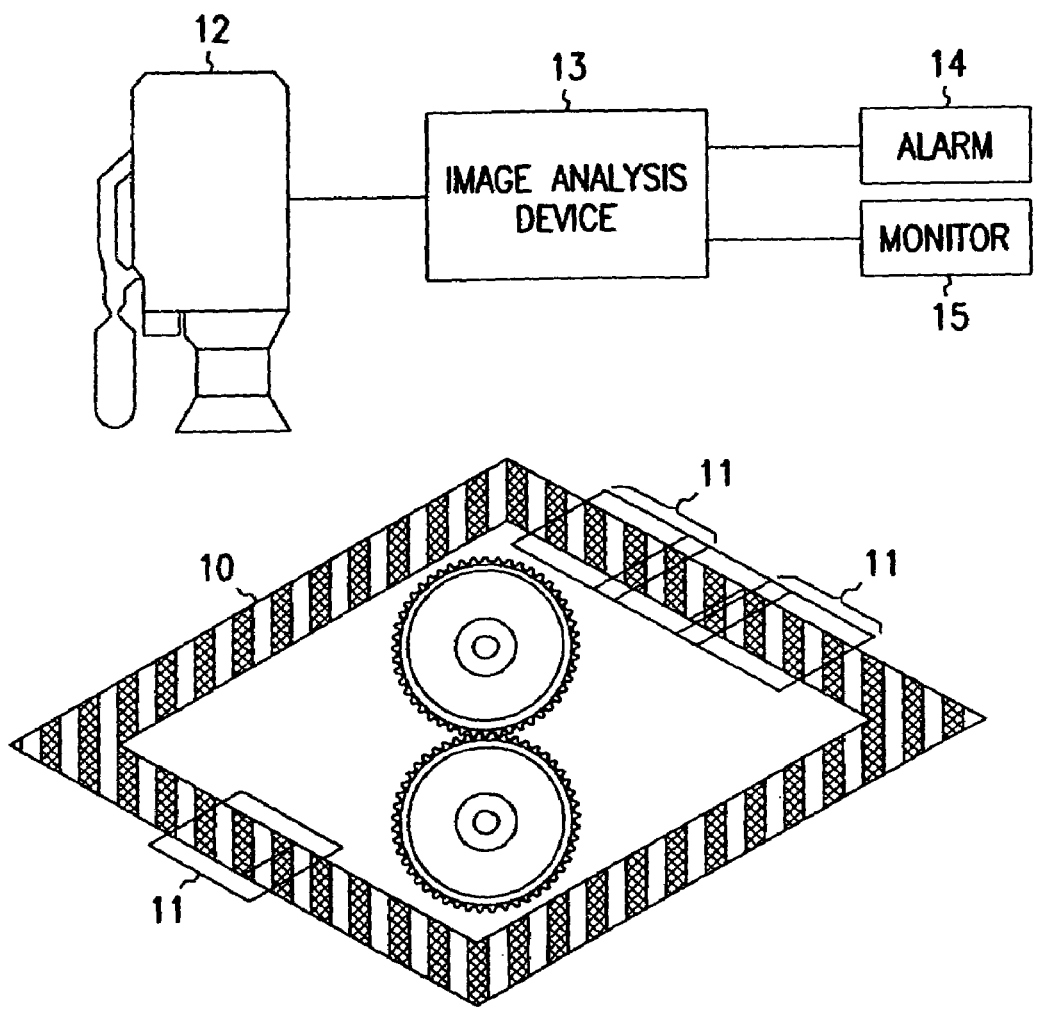
FIG. 2 depicts an embodiment of the present invention.

One embodiment of the present invention utilizes a patterned area surrounding an area into which objection detection is desired. An example of such an embodiment is depicted in FIG. 2 along with three overlapping mask windows 11. In actual operation, the number of mask windows 11 would be sufficient to allow the entire patterned background to be monitored for objects. Each mask window 11 is analyzed for the presence of objects. It is assumed that no object can enter the surrounded area without passing through the patterned area. Thus, if no object is detected in any of the mask windows 11, then no object will have been detected in the patterned area and it can be assumed that no object has entered the surrounded area.

FIG. 2 also shows an image capturing device 12, an image analysis device 13, and two different types of warning devices: an alarm 14 and a monitor 15. Image capturing devices 12 useful in the present invention are known in the art. Image capture device 12 may be a camera or other device capable of capturing an image. Various attachments can be used with image capture device 12 to enhance or modify the manner in which an image is captured. For example, a telescopic lens attached to image capture device 12 enables the monitoring of an area at a significant distance from the image capture device 12. Generally, images captured by the image capturing device 12 are analyzed, and stored if necessary, in the image analysis device 13. Image analysis devices 13 useful in the present invention can be any devices capable of carrying out the calculations required by the present invention. For example, the image analysis device 13 can be a computing device, such as a personal computer, programmed to carry out the needed calculations. In one embodiment, the image capture device 12 and the image analysis device 13 reside in the same hardware. For example, the image capture device 12 can be a camera having an on-board or embedded microprocessor used as an image analysis device 13. If an object is detected an appropriate signal or indication is made. The signal can take the form of sounding and alarm 14 or displaying information on a monitor 15.

The embodiment depicted in FIG. 2 can be effectively utilized in an industrial setting, for example, where the area of interest is a portion of a floor, perhaps containing potentially hazardous equipment. A pattern according to the present invention can be painted on the floor surrounding the area of interest. An imaging device is then placed in a position (on the ceiling, for example) such that the patterned area can be monitored for objects. If an object is detected in the patterned area, an alarm can be sounded or the potentially hazardous equipment shut down.

The present invention takes advantage of certain characteristics or phenomena about the difference between a current or live image and a reference image. A difference image can be calculated by subtracting the brightness level of the reference image from the brightness level of the live image at each pixel. The calculation of a difference image can be represented by the following equation:

$$\text{Diff}(x,y) = \text{Live}(x,y) - \text{Ref}(x,y)$$

where Live(x,y) represents the brightness level at position (x,y) in a live image, Ref(x,y) represents the brightness level at the same position (x,y) in the reference image, and Diff(x,y) represents the difference between these two brightness levels.

Figure 3:
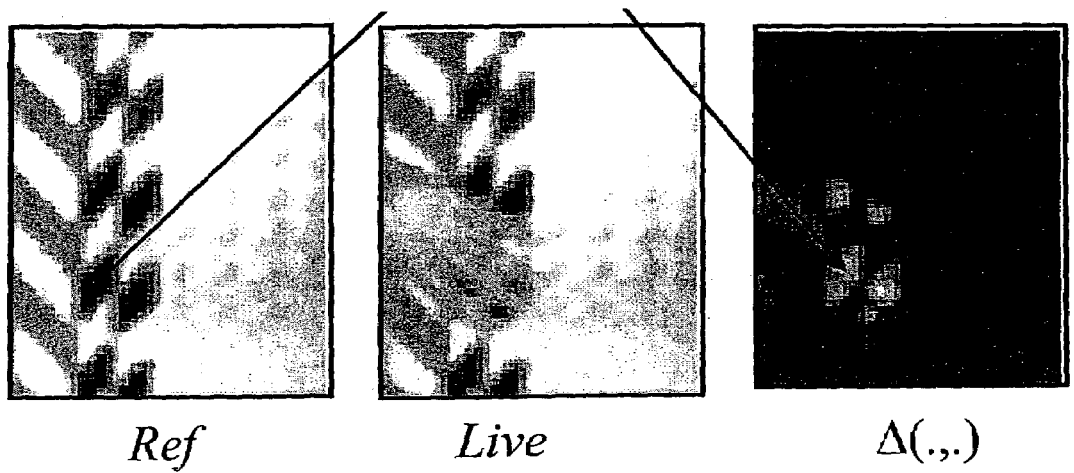
FIG. 3 depicts a reference image, a live image containing an object (that is, a hand), and a reference image produced in accordance with the present invention.

According to the present invention, the following phenomena is utilized. Whenever an object is located in the live image at a position (x,y), Diff(x,y) will be the complement of Ref(x,y). That is, if Ref(x,y) is a light pixel (that is, has a high brightness level) then Diff(x,y) will have a lower brightness level than Ref(x,y) and if Ref(x,y) is a dark pixel then Diff(x,y) will have a higher brightness level than Ref(x,y). Accordingly, Diff(x,y) will be the complement or inverse of Ref(x,y) when an object is present in the live image. This phenomena is shown in FIG. 3 and can be further explained in the following manner:

Let $I_L$=value of Ref(x,y) when Ref(x,y) is a light pixel,
Let $I_D$=value of Ref(x,y) when Ref(x,y) is a dark pixel, and
Let l=the value of Live(x,y). Then,
Diff(x,y)=(l-$I_L$) if Ref(x,y)=$I_L$
Diff(x,y)=(l-$I_D$) if Ref(x,y)=$I_D$
Since $I_D$<$I_L$, the following inequality holds
(l-$I_D$)>(l-$I_L$),∀l According to the present invention, the following phenomena is also utilized. Let $\text{Diff}_L(x,y)$ be that portion of the difference image corresponding to the position where the pixels in Ref(x,y) are light and let $\text{Diff}_D(x,y)$ be that portion of the difference image corresponding to the position where the pixels in Ref(x,y) are dark. When an object has entered the mask window the expected value (typically calculated as the average value) of the values in $\text{Diff}_L$ should be less than the expected value of the values in $\text{Diff}_D$. This is expressed as follows:

$$\exists \text{ an object} \rightarrow E[\text{Diff}_L(x,y)] < E[\text{Diff}_D(x,y)],$$

where $E[\text{Diff}_L(x,y)]$ is the expected value of the pixels in $\text{Diff}_L(x,y)$ and $E[\text{Diff}_D(x,y)]$ is the expected value of the pixels in $\text{Diff}_D(x,y)$. Equivalently, this can be expressed as follows:

$$E[\text{Diff}_L(x,y)] \geq E[\text{Diff}_D(x,y)] \rightarrow \not\exists \text{ an object}$$

This equation can be rearranged to produce the following:

$$(E[\text{Live}_L(x,y)] - E[\text{Live}_D(x,y)]) \geq (E[\text{Ref}_L(x,y)] - E[\text{Ref}_D(x,y)]) \rightarrow \not\exists \text{ an object}$$

where $\text{Live}_L(x,y)$ is that portion of the live image corresponding to the position where the pixels in Ref(x,y) are light and let $\text{Live}_D(x,y)$ be that portion of the live image corresponding to the position where the pixels in Ref(x,y) are dark. Since Ref(x,y) is known and is constant, the expected value of $\text{Ref}_L(x,y)$, $E[\text{Ref}_L(x,y)]$, is only required to be calculated once. This calculation can be done during the configuration or initialization of the system prior to operating the system. Similarly, $E[\text{Ref}_D(x,y)]$ can be calculated once and then used whenever needed. Let the constant $(E[\text{Ref}_L(x,y)] - E[\text{Ref}_D(x,y)])$ be represented as $\gamma_{ref}$. The above equation then becomes:

$$(E[\text{Live}_L(x,y)] - E[\text{Live}_D(x,y)]) \geq \gamma_{ref} \rightarrow \not\exists \text{ an object}$$

The present invention also utilizes another phenomenon. If a shadow falls on a pattern of the present invention it will darken all pixels to some degree, but will not cause lighter pixels to have intensity values lower than the darker pixels. That it, the expected value of the light pixels in a live image, $E[\text{Live}_L(x,y)]$, should be greater than the expected value of the dark pixels in a live image, $E[\text{Live}_D(x,y)]$, even when there is a shadow in the mask window. This observation can be expressed by the following equation.

$$(E[\text{Live}_L(x,y)] - E[\text{Live}_D(x,y)]) < 0 \rightarrow (\exists \text{ an object})$$

The two equations above cover all cases except those covered by the following equation.

$$0 < (E[\text{Live}_L(x,y)] - E[\text{Live}_D(x,y)]) < \gamma_{ref}$$

In an ideal world, the above condition would be considered an object intrusion since the difference in expected values found in the live image is less than the difference in expected values found in the reference image, namely $\gamma_{ref}$. However, this analysis of the above condition does not address any noise effects. Taking noise effects into consideration in conjunction with the above three equations, an object is detected when the difference in expected values is less than some threshold T, where the value of T is greater than 0 and less than $\gamma_{ref}$.

Thus, according to the present invention, an object is detected when $$(E[\text{Live}_L(x,y)] - E[\text{Live}_D(x,y)]) < T,$$

where $0 < T < \gamma_{ref}$. In a preferred embodiment of the present invention, T is equal to about $\gamma_{ref}/2$. Values of T may be optimized for specific applications without undue experimentation.

Once an object is detected, the present invention can indicate or signal that an object has been detected in any number of ways known in the art. For example, a system according to the present invention could send a signal to an alarm system.

Figure 4:
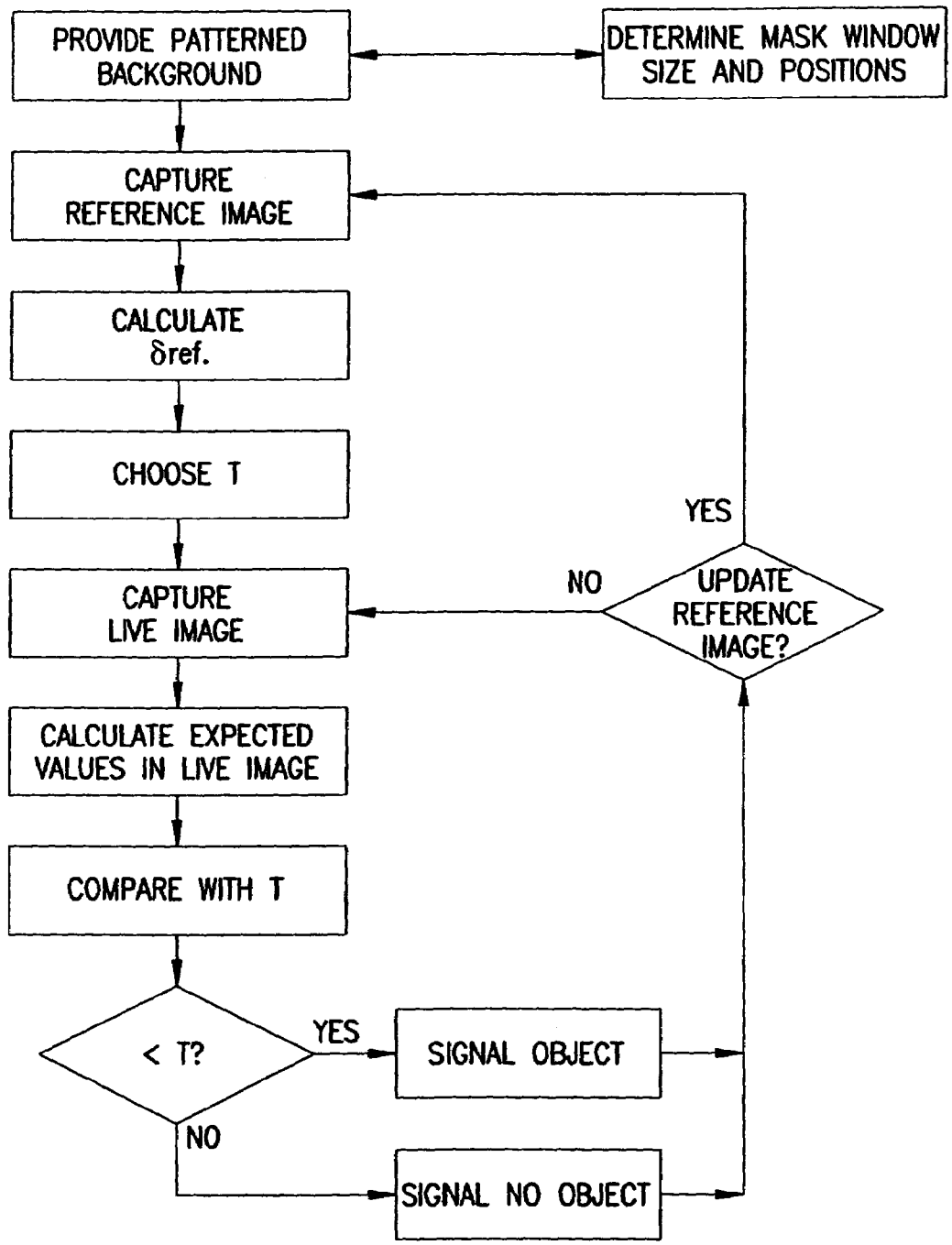
FIG. 4 shows a flowchart embodying a method according to the present invention.

FIG. 4 shows a flowchart embodying a method according to the present invention. It should be understood that FIG. 4 is intended to be illustrative, not restrictive. Many other embodiments of the present invention will be apparent to those of skill in the art. For example, the particular sequence of steps depicted in FIG. 4 does not imply any temporal ordering of their execution in the broadest embodiments of the present invention.

What is claimed is:

1. A method for detecting an object in an area, comprising:
    capturing a reference image of the area without the object present, wherein the area includes an intentionally patterned background with both light areas and dark areas, wherein the light areas and dark areas have an intended interrelationship;
    capturing a live image; and
    determining if the object is present by comparing the reference image and the live image.

2. A method according to claim 1 wherein the area is at least part of a larger area.

3. A method according to claim 1 further comprising at least one other area that at least partially overlaps the area, and the method further includes the step of determining if the object is present in the at least one other area by comparing the reference image and the live image.

4. A method according to claim 2 wherein the larger area at least partially encircles an area to be monitored.

5. A method according to claim 2 wherein the larger area corresponds to an area to be monitored.

6. A method according to claim 1 wherein the area corresponds to a monitored area.

7. A method according to claim 1 wherein the area is a mask window.

8. A method according to claim 1 wherein the patterned background includes an approximately equal amount of light areas and dark areas.

9. A method according to claim 1 wherein the patterned background includes a number of parallel extending light areas and dark areas.

10. A method according to claim 1 wherein the patterned background includes a checkerboard pattern of light areas and dark areas.

11. A method according to claim 1 wherein the light areas and/or dark areas each have a size that is smaller than the object.

12. A method according to claim 1 wherein the determining step comprises the steps of:
    determining a difference image by determining a difference in intensity between corresponding locations of the reference image and the live image; and
    determining if at least a portion of the difference image includes a complement or inverse image of the object.

13. A method according to claim 1 wherein the determining step comprises the steps of:
    determining a difference image by determining a difference in intensity between corresponding locations of the reference image and the live image; and
    determining if the intensity of at least part of the difference image exceeds a threshold value.

14. A method for detecting an object in an area, comprising:
    providing a patterned background in the area, wherein the patterned background includes both light areas and dark areas with an intended interrelationship;
    capturing a reference image of the area without the object present;
    capturing a live image of the area; and
    determining if the object is present in the area by comparing the reference image and the live image.

15. A method according to claim 14 wherein the area corresponds to an area of a floor, and the patterned background is fixed to the area of the floor.

16. A method according to claim 15 wherein the patterned background is painted on the area of the floor.

17. An object detection system, comprising:
    a patterned background fixed to an area, wherein the patterned background includes both light areas and dark areas with an intended interrelationship;
    an image capture device for capturing a reference image of the area without the object present, and a live image of the area; and
    a processing element for determining if the object is present in the area by comparing the reference image and the live image.

18. An object detection system according to claim 17 wherein the area is at least part of a larger area.

19. An object detection system according to claim 18 wherein the larger area at least partially encircles an area to be monitored.

20. An object detection system according to claim 18 wherein the larger area corresponds to an area to be monitored.

21. An object detection system according to claim 17 wherein the area corresponds to a monitored area.

22. An object detection system according to claim 17 wherein the patterned background includes an approximately equal amount of light areas and dark areas.

23. An object detection system according to claim 17 wherein the patterned background includes a number of parallel extending light areas and dark areas.

24. An object detection system according to claim 17 wherein the patterned background includes a checkerboard pattern of light areas and dark areas.

25. An object detection system according to claim 24 wherein the light areas and/or dark areas each have a size that is smaller than the object.

* * * * *